Patented May 15, 1934

1,959,189

UNITED STATES PATENT OFFICE 1,959,189

PROCESS FOR THE PREPARATION OF CATALYSTS

John C. Woodhouse, Wilmington, Del., assignor, by mesne assignments, to E. I. du Pont de Nemours & Company, Wilmington, Del., a corporation of Delaware No Drawing. Application January 14, 1931, Serial No. 508,813. Renewed September 30, 1933

4 Claims. (Cl. 23—212)

This invention relates to a process for the preparation of catalysts and particularly to a process in which during the preparation of the catalyst a metal compound is precipitated from solution by a precipitant that is difficultly soluble therein.

The principal processes at present employed for preparing catalysts for various chemical reactions, such, for example, as the manufacture of hydrogen from steam and carbon monoxide or steam and hydrocarbons, the conversion of methanol to acetic acid, the synthesis of methanol, etc. from carbon monoxide and hydrogen, etc., involve painstaking precipitating, drying, and reduction steps whereby the catalytic material is eventually evolved in a physical and chemical state such that it possesses the maximum degree of catalytic activity. In spite of the greatest care in their preparation many metals and metal compounds, closely related chemically to others showing exceptional catalytic activity in certain reactions, exhibit no, or at most but slight, activity therein. Other metals which are usually highly active when prepared by a standard catalytic preparation method will sometimes be found, even after careful preparation, to be only moderately active in particular reactions.

An object of the present invention is to provide a process for the preparation of catalysts for various chemical processes. Another object of this invention is to provide a process for the preparation of catalysts in which a metallic salt is precipitated by a difficultly soluble precipitant. A further object of this invention is to provide a new process for the preparation of catalysts wherein a metallic compound is precipitated by adding to a solution of said compound a solid precipitant. Other objects will hereinafter appear.

Catalysts are generally prepared by precipitating a salt of the metal from solutions with a suitable precipitant, usually one which will precipitate the metal in such form that on calcination an oxide of the metal will be obtained. After precipitation the precipitate is filtered, washed free of the filtrate, dried, and calcined. The oxide is then used as such or frequently after reduction to metal by means of hydrogen or other reducing agent.

My process for catalyst preparation differs from the above general process in that I precipitate the metallic salt in such a manner that a highly active catalyst is obtained, even from compounds from which, heretofore, catalysts of no activity or but mediocre activity only were obtainable. I have found that if a metal compound is precipitated from solution by a precipitant, which is difficultly soluble in that solution, a catalyst of superior activity may be obtained. In fact, many catalysts which for various processes have shown in the past substantially no activity are made highly active when prepared by my process.

The relatively difficultly soluble precipitants which have proven to be especially useful for this process include salts of manganese, calcium, strontium, barium, magnesium, etc., especially hydroxides, carbonates, and oxalates, of these and other metallic elements, which are relatively difficultly soluble in the solution containing the catalytic element and which are, of course, likewise precipitants for the same. The hydroxides of the alkaline earths, particularly, have been found to produce highly active catalysts by this process, although other salts of the alkaline earth metals may likewise be employed.

The essential characteristic of the precipitant is that it be but relatively slightly soluble in the solution of the metal to be prepared as a catalyst and that it be capable of precipitating said metal as a compound which can be dried and/or calcined and, if desired, reduced to a catalyst.

Having observed that it is difficult to obtain adequate precipitation by adding a solution of a difficultly soluble precipitant without using excessive amounts thereof, I preferably employ the novel method wherein the precipitant is added as a solid to the solution of the metal to be precipitated, thus obtaining a precipitate of the latter in an efficient and economical manner. The metal compound is thereby precipitated at a satisfactory rate and, although associated to a greater or less extent with excess solid precipitant, it can subsequently be thoroughly freed therefrom by washing, if such be necessary. In selecting a solid precipitant it should be borne in mind that it should have a relatively higher solubility in the solution than has the metal compound to be precipitated, for, should the reverse be true, no precipitate would result.

If the foregoing considerations be borne in mind, together with the more detailed examples below, those skilled in the art can without difficulty determine for the case of any particular catalytic metal what precipitant is adapted for use in accordance with the invention. If the precipitant be properly selected, it is not critical what anion be originally associated with the catalytic metal ion, as in the course of the precipitation the anion remains in solution and can readily be separated from the precipitated catalyst by filtration and washing. It will be apparent that my process may be described as one in which a catalyst is prepared from a metallic ion by precipitating said metallic ion from solution by a precipitant which is difficultly soluble therein. While the invention is not limited to any explanation or theory as to the superior activity of the catalysts prepared in accordance therewith, it would appear that, due to the slowness of the precipitation of the catalytic metal compound, it assumes a physical form and structure which, after calcination and, if desired, reduction, etc., particularly favor the intimate molecular contact necessary for effective catalysis.

Only when preparing a catalyst from metallic salts whose anions may have some objectionable effect in the particular catalytic reaction for which the catalyst is prepared, or when the precipitant itself has an objectionable effect, is it necessary to thoroughly wash the precipitant and soluble product of the reaction from the precipitate. For example, if a nickel, cobalt, or iron (i. e. an iron group metal) catalyst is precipitated by an alkaline earth hydroxide, and a small percentage of the latter is allowed to remain in the catalyst, say up to 4–5%, and in some instances more, it will usually have no deleterious effect and, in fact, in some cases will improve the activity of the catalyst.

When the metals of the iron group are used as unpromoted catalysts for the methane:steam conversion reaction, they exhibit a peculiar behavior. All of the unpromoted metal catalysts of this group, viz. nickel, cobalt, and iron, have been found to vary considerably in their catalytic activity in accordance with the particular methane to steam ratio used in the reaction. For example, nickel alone, as ordinarily prepared, shows substantially no conversion at low steam ratios, while as the steam:methane ratio increases to about 3.5 to 1 the activity of the nickel rises to a maximum, resulting, for a given temperature and pressure, in, say, approximately 50% conversion. On the other hand as the steam ratio is raised from 3.5:1 to, say, 6:1, the activity of the nickel drops, in some instances, the conversion being 10% or lower. Cobalt acts in much the same way, having its maximum activity at a somewhat higher steam ratio, viz. in the neighborhood of 4.5:1. However, with the use of promoters, such as those described in the Roger Williams U. S. application Ser. No. 118,600, a number of which can readily be incorporated in the catalysts in accordance with the present process, the activity of the metals of the iron group increases to a higher maximum at a steam:gas ratio of about 6:1 and retains that high maximum over a greater range of steam to gas ratios, even to as hgh as 20:1, and often higher.

When unpromoted nickel is prepared by my slow precipitation process it no longer has the characteristics shown above in accelerating the methane conversion reaction, but has an activity similar to that of a promoted nickel catalyst; i. e. it increases in its activity to a higher maximum, which is also held over a greater range of steam to gas ratios, than is the case with nickel prepared by the usual methods.

I will now give several examples for preparing catalysts in accordance with my process, but it will be understood that the details described do not in any way limit the scope of this invention, as they are but illustrative of specific embodiments of my process, it being possible to employ numerous others without in any way departing from the invention.

*Example 1.*—1000 parts of nickel nitrate are dissolved in 800 parts of distilled water. This solution is heated to 50° C. and stirred while 250 parts of solid calcium hydroxide are slowly added. When the precipitation is complete, the solution is allowed to cool to room temperature and the precipitate washed to any desired low content of calcium, or until it is entirely free therefrom. The precipitate is collected on a filter, heated until dry at 125° C. and made into pills of 8–14 mesh in a pilling machine. The catalyst is reduced by placing it in position in the reaction vessel and raising the temperature slowly, over a period of several hours, from room temperature to 450° C. in a stream of hydrogen or other reducing gas. It is now ready for use in the methane:steam conversion reaction.

*Example 2.*—1500 parts of nickel nitrate are dissolved in 1200 parts of distilled water and heated to 80° C. 976 parts of barium hydroxide, as a solid and in solution in 500 parts of distilled water, are added slowly with stirring to the nickel nitrate solution. The solution is diluted with 2000 parts of distilled water at 80° and the stirring continued until precipitation is complete, then cooled, allowed to settle and washed until precipitate contains any desired low content of barium or until it is entirely free therefrom. It may be reduced as described under Example 1.

*Example 3.*—469 parts of nickel nitrate are dissolved in 500 parts of distilled water. The solution is heated to 60° C. and stirred during the slow addition of 453 parts of solid strontium hydroxide. The solution is diluted with 1000 parts of water and stirred until precipitation is complete, allowed to cool, settle and washed until precipitate contains any desired low content of strontium or until it is entirely free therefrom. The precipitate is collected on a filter, dried at 125° C. and ignited at 350° C. in an electric muffle furnace for several hours. It is pilled and reduced as described under Example 1.

*Example 4.*—238 parts of solid magnesium carbonate are slowly added with stirring to a solution made up of 500 parts of nickel nitrate and 500 parts of distilled water. The precipitation is carried out at room temperature and the stirring continued until precipitation is complete, then allowed to settle and the precipitate washed to any desired low content of magnesium or until it is entirely free therefrom. The precipitate is collected on a filter, heated until dry at 125° C. and ignited several hours in an electric muffle furnace at 350° C. It is pilled and reduced as described under Example 1.

*Example 5.*—400 parts of nickel nitrate are dissolved in 500 parts of distilled water. This solution is heated to 60° C. and stirred while 260 parts of solid manganese oxalate are slowly added. When precipitation is complete, the solution is allowed to cool to room temperature and the precipitate washed to any desired low content of manganese, or until it is entirely free therefrom. The precipitate is collected on a filter, heated until dry at 125° C. and ignited in an electric muffle furnace at 350° C. for several hours. It is pilled and reduced as described under Example 1.

*Example 6.*—500 parts of nickel nitrate are dissolved in 2000 parts of hot distilled water. 384 parts of solid calcium chromate are suspended in 1000 parts of hot distilled water and added slowly with stirring to the nickel nitrate solution. The mixture is heated to 80° C. and stirred until precipitation is complete, allowed to cool, and the precipitate washed. The precipitate is then treated as described under Example 1.

*Example 7.*—400 parts of cobalt nitrate are dissolved in 600 parts of distilled water. The solution is heated to 50° C. and stirred while 100 parts of solid calcium hydroxide are slowly added. When precipitation is complete, the solution is allowed to cool, settle, and washed to any desired low content of calcium, or until it is entirely free therefrom. The precipitate is then treated as described under Example 1.

*Example 8.*—319 parts of barium hydroxide as a solid and in solution, in 100 parts of distilled water, are heated to 80° C. 500 parts of zinc nitrate are dissolved in 700 parts of distilled water and also heated to 80° C. The barium hydroxide is slowly added with stirring to the zinc nitrate solution and stirred until precipitation is complete, allowed to settle, and the precipitate washed to any desired low content of barium or until it is entirely free therefrom. It may be reduced by any suitable process.

The catalysts of the foregoing examples, as well as others that may be prepared in analogous manner, may be used in various reactions to which, by their known catalytic properties, they are adapted. Thus, nickel, as prepared by Examples 1-6 inclusive, or cobalt, Example 7, may be placed in a conversion chamber and after calcination to a temperature of 400° C. and reduction in an atmosphere of hydrogen at approximately the same temperature, is then used as a catalyst for the methane:steam conversion reaction. Steam and methane in the ratio of 4.5:1 is passed over this catalyst at a temperature of 525° C. and a space velocity of about 250 based on the methane, whereby a conversion of methane to hydrogen of approximately 50% will be realized.

The zinc oxide, as prepared in Example 8 and preferably in the form of suitably sized pellets or tablets, is placed in a suitable converter and reduced in an atmosphere of pure hydrogen slowly at a temperature of 150–350° C. The resultant catalyst may be employed for the production of methanol by passing a gaseous mixture containing hydrogen and carbon monoxide in the volume ratio of 20:1 and at a space velocity of 100,000 to 150,000, a pressure of 400 atmospheres, over it while maintaining a temperature within the range of 250–400° C. The principal product which will be obtained is methanol which is associated with some of its higher homologues.

The invention is obviously not limited in its application to the preparation of single component catalysts. Compound catalysts, i. e. those in which a catalytic element, e. g. nickel, is chemically combined with a promoter, e. g. chromium, may be prepared, as in Example 8, by adding a relatively difficultly soluble chromate to a solution of nickel nitrate. Likewise, mixed catalysts, i. e. containing two or more active catalytic elements, may be prepared, as by adding a suitable precipitant, e. g. calcium hydroxide, to a solution of nickel and cobalt nitrates. Or, if desired, the complex catalysts may include promoters chemically combined therewith.

From a consideration of the above disclosure it will be realized that any process involving the preparation of catalysts by precipitating a metal from solution by addition of a precipitant which is relatively difficultly soluble therein, as well as the catalyst so produced, will come within the scope of this invention, whether or not said precipitated catalyst be employed as a promoted or unpromoted catalyst in the elemental state or chemically combined as oxide or otherwise; and whether or not it be used in the methane:steam conversion reaction, the synthesis of methanol from carbon oxides and hydrogen, or in any other reaction in which it functions catalytically.

Various changes can be made in the method hereinbefore described without in any way departing from the invention or sacrificing any of the advantages that may be derived therefrom.

I claim:

1. A process for the preparation of hydrogen by the interaction of a hydrocarbon and steam in the presence of a nickel catalyst which has been prepared by a process including the steps which comprise precipitating a nickel salt from solution by a precipitant which is relatively difficultly soluble therein and removing the precipitant prior to use.

2. A process for the preparation of hydrogen by the interaction of a hydrocarbon and steam in the presence of a cobalt catalyst which has been prepared by a process including the steps which comprise precipitating a cobalt salt from solution by the addition thereto of a solid alkaline earth hydroxide which is relatively difficultly soluble therein and removing the alkaline earth prior to use.

3. A process for the preparation of hydrogen by the interaction of a hydrocarbon and steam in the presence of a catalyst which has been prepared by a process including the steps which comprise precipitating an iron salt from solution by a precipitant which is relatively difficultly soluble therein and removing the precipitant prior to use.

4. A process for the preparation of hydrogen by the interaction of a hydrocarbon and steam in the presence of a metal of the iron group catalyst which has been prepared by a process including the step which comprises precipitating the metal of the iron group salt from solution by a precipitant which is relatively difficultly soluble therein, and removing the precipitant prior to use.

JOHN C. WOODHOUSE.